June 16, 1953  T. L. BEACH, JR  2,642,244
REAR-VISION MIRROR
Filed Sept. 27, 1948  2 Sheets-Sheet 1
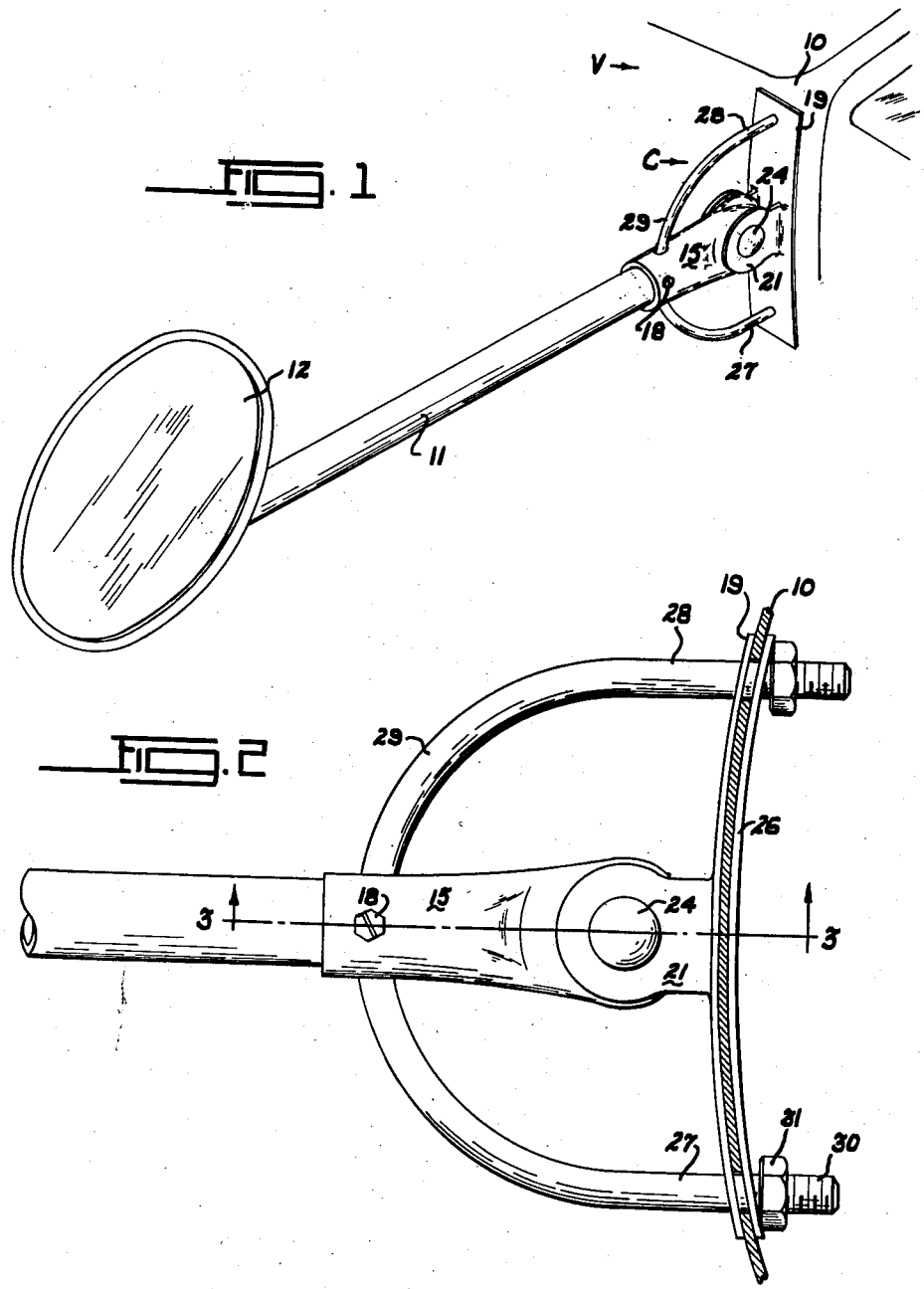
INVENTOR
THEODORE L. BEACH JR.
BY
*Taulmin & Taulmin*
ATTORNEYS June 16, 1953  T. L. BEACH, JR  2,642,244
REAR-VISION MIRROR
Filed Sept. 27, 1948  2 Sheets-Sheet 2
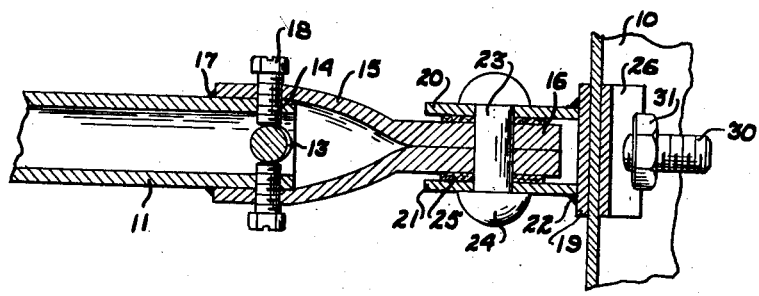
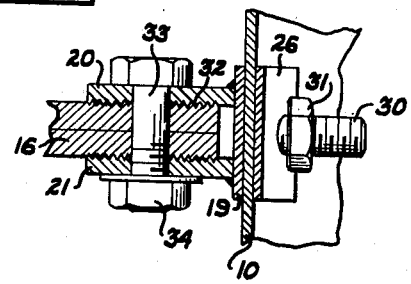
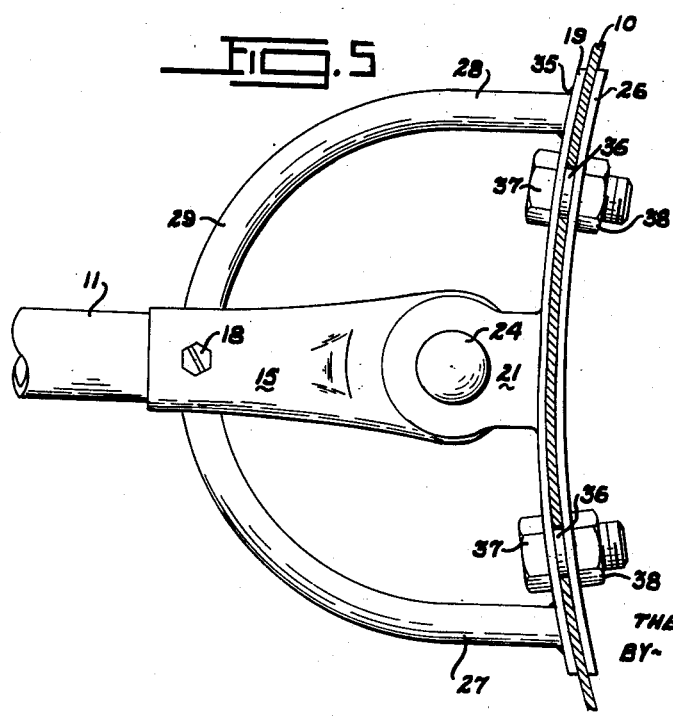
INVENTOR
THEODORE L. BEACH JR.
BY
Toulmin & Toulmin
ATTORNEYS Patented June 16, 1953

2,642,244

UNITED STATES PATENT OFFICE 2,642,244

REAR-VISION MIRROR

Theodore L. Beach, Jr., New Carlisle, Ohio

Application September 27, 1948, Serial No. 51,355

3 Claims. (Cl. 248—291)

This invention relates to rear view mirrors and is concerned primarily with mirrors of the type which out-stand from the one or more sides of the vehicle and which are used on trucks, buses and similar commercial vehicles.

A rear view mirror of the type with which this invention is concerned ordinarily comprises an arm which may be adjustable as to length and the free end of which carries the mirror proper which is mounted thereon by a universal joint to afford the necessary adjustability. The inner end of this arm is anchored to the vehicle body and in accordance with the latest trends in this field, it is recognized that this connection be of a pivotal type that is capable of being locked in an adjusted position.

At the present time, there are available to the public rear vision mirrors having pivotal connections at the points where they are joined to the vehicle bodies together with means which support and hold them in an adjusted position. However, it has been found that under conditions of practical usage, the shocks and jars to which a truck or a similar vehicle is subjected are of such severity as to jar the mirrors loose from an adjusted position. This is, of course, an extremely undesirable condition.

With the foregoing conditions in mind, the present invention has in view, as its foremost objective the provision of a rear vision mirror of the type indicated which includes a new and improved pivotal joint at the anchorage of the arm to the vehicle. This joint is intended to securely lock the arm in an adjusted position so that it will remain there during service usage and will also provide improved appearance effects as compared with anything now available on the market.

There is a noticeable trend in the field of truck manufacture to enhance the beauty and appearance of commercial trucks as much as practical circumstances will permit. The rear vision mirrors now available generally afford a pleasing appearance effect from only one side with the other giving an unsightly appearance. In accordance with the present invention, the rear vision mirror will include structure giving the same appearance effect for both sides at least so far as the anchorage to the vehicle body is concerned.

A further object of the invention is to provide, in a rear view mirror of the type indicated, a pivotal connection at the point where the mirror carrying arm is connected to the body, together with an arcuate support for said arm on which the arm is adjustable to be guided and supported during the pivotal adjustment and to which the arm may be locked in any adjusted position so as to maintain it in that position.

Various other more detailed objects and advantages of the invention such as arises in connection with carrying out the above noted ideas in a practical embodiment will in part become apparent and in part be herein stated as the description of the invention proceeds.

The invention, therefore, comprises a rear vision mirror for motor vehicles which includes a pivotal connection between the inner end of the mirror carrying arm and the vehicle body together with an arcuate guide support that cooperates with said arm and to which the arm may be locked in an adjusted position.

For a full and more complete understanding of the invention, reference may be had to the following description and accompanying drawings wherein:

Figure 1 is a perspective view illustrating a rear view mirror designed in accordance with the precepts of this invention as anchored to a vehicle body;

Figure 2 is an enlarged detailed view mostly in side elevation but partly in section bringing out the anchorage of the mirror arm to the vehicle body;

Figure 3 is an enlarged detailed section through the pivotal connection and the arm, this view being taken about on the plane represented by line 3—3 of Figure 2;

Figure 4 is a sectional view taken on the same plane as Figure 3 but developing one modification; and Figure 5 is a view similar to Figure 2 of another modified form of the invention.

Referring now to the drawings wherein like reference characters denote corresponding parts and first more particularly to Figure 1 a portion of the vehicle body is therein illustrated and referred to generally by the reference character V. The vehicle V includes a cowl at 10 to which the rear vision mirror is to be anchored.

The rear vision mirror comprises three main parts. These are the arm shown at 11 which may or may not be adjustable as to length, the structure which carries the mirror proper such as is represented at 12. At this point, it is well to note that the mirror 12 is ordinarily mounted on the front end of the arm 11 by a universal joint such as one of the ball and socket type. However, this connection is not herein illustrated because it is not a part of the present invention. This particular manner of mounting the mirror on the arm is old and well known in this art. The inner end of the arm 11 is secured to the cowl 10 by an adjustable connection which is referred to in its entirety by the reference character C.

Referring now more particularly to Figures 2 and 3, it will be noted that arm 11 is of a tubular construction and the inner end thereof is formed with aligned openings 13 and a second pair of aligned openings 14 which are arranged at an angle of substantially 90 degrees with respect to the openings 13. Thus the openings or apertures are substantially annularly arranged in quadrature about the tubular arm. This end of the arm 11 is snugly received within the front end of a tubular section 15 and anchored thereto in any preferred manner such as by the welding represented at 17. The tubular member 15 has a flattened portion 16. It is important to note that the tubular part 15 is formed with openings that correspond to and align with the openings 13 and additional openings that correspond to and align with the openings 14. The latter are threaded and the double thickness of metal provided by the over-lapping arm 11 and tube 15 affords sufficient length in the threads to provide a good bearing for the set screws 18 for a purpose to be later described.

An outer plate 19 is shaped to conform to the contour of the cowl 10 and the plate 19 engages the outer surface of this cowl 10. Outstanding from the plate 19 are a pair of spaced ears 20 and 21. These ears may be either integrally formed with the plate 19 or connected thereto by the welded joints shown at 22.

The flattened portion 16 of the tubular section 15 is received between the ears 20 and 21. These ears and the flattened portion 16 are formed with aligned openings through which passes a pivot pin 23. This pivot pin may be of any preferred type although the invention has particularly in mind the pin 23 having the rivet heads shown at 24. Friction washers 25 are interposed between each ear and the corresponding face of the flat section 16.

In assembling the parts above described, the heads 24 will be formed on the pin 23 so as to provide sufficient pressure on the washers 25 to provide the friction effect which aids in holding the arm 11 in an adjusted position.

Referring now more particularly to Figure 2, a backing plate 26 is shown as being positioned against the inner face of the cowl 10 with which it conforms in shape. The plate 19, cowl 10 and backing plate 26 are formed with aligned openings through which pass legs 27 and 28 of an arcuate guide and support 29. The latter includes a portion which is an arc defined by a portion of the circumference of a circle the center of which is determined by the axis of the pin 23 and the arcuate portion ranges in extent from 90 to 135 degrees depending upon the particular type or model of vehicle on which the mirror is to be installed. The legs 27 and 28 are shaped and dimensioned to adapt it to any particular model.

The inner end of each of these legs is threaded as indicated at 30 and a nut 31 is screwed onto each threaded portion so as to bear against the inner face of the backing 26. The nuts 31 constitute the means for anchoring the connection C to the vehicle cowl 10.

It is important to note that the arcuate position of the guide support 29 passes through the aligned openings 13 and that the inner ends of the set screws 18 are adapted to bear against this arcuate guide support. Thus, when it becomes necessary to adjust the position of the arm 11, all that is necessary is to loosen the set screws 18. The arm may now be swung to any angle or position whereupon the set screws 18 are tightened to lock the arm 11 in its adjusted position. It is evident that due to the structural arrangement of the arm 11 with respect to the guide support 29 and also due to the fact that the pivotal pin 23 has duplicate heads at each end the connection at C will give exactly the same appearance effect from the front as from the rear. Furthermore, due to the substantial radius of the guide support 29, the locking effects of the set screw 18 will be effective over a lever arm that is sufficiently long to insure that the arm 11 will remain in an adjusted position during the service conditions to which the vehicle is ordinarily subjected. It is also notable that the holes 13 are formed in the exact center of arm 11 and section 15. Thus, the rear vision mirror is equally adaptable to being mounted on either side of the vehicle V.

Referring now more particularly to Figure 4, a slightly modified form of the invention will be described. It will be noted that in this form the inner faces of the ears 20 and 21 are serrated as represented at 32. The outer faces of the flattened section 16 are formed with complemental serrations and the friction washers at 25 are eliminated. A bolt 33 carrying a nut 34 is employed in place of the pin 23 having rivet heads. It is evident that when the nut 24 is tightened the serrations 32 are locked to prevent relative rotation of the arm 11 with respect to ears 20 and 21. On the other hand, when the nut 34 is loosened, the ears 20 and 21 spring loose and the arm 11 may be swung into any adjusted position whereupon the nut 34 may again be tightened to lock it in its adjusted position. Thus the locking effects of the set screws 18 are supplemented by these serrations 32.

Figure 5 illustrates still another modification in which the connection at C is adapted to be anchored to the vehicle V when the cowl 10 does not permit the legs of 27 and 28 to extend through the points indicated. In this form of invention, legs 27 and 28 are joined to the plate 19 by the welded joints shown at 35. The plate 19, cowl 10 and backing plate 26 may be formed with aligned openings at any places which are conveniently accessible according to the construction of the vehicle V. Such openings are shown at 36. Headed bolts 37 pass through these aligned openings and nuts 38 are screwed thereon in the usual manner.

It will be apparent that certain advantages might obtain from rigidly securing the legs 27 and 28 of the arcuate member 29 to the plate 19 of Figures 1 and 2, if so desired, or the said legs could be shouldered so that the tightening of the nuts 31 on the threaded ends of the legs would cause the assembly to be very rigidly clamped in position.

It will also be apparent that although the device of this invention has been illustrated as being mounted for angular adjustment in a vertical plane, it could as well be mounted for angular adjustment in a horizontal plane.

In the latter instance the supporting bracket means would be modified in shape, if necessary, to conform with the part of the body or the hinge of the vehicle on which the mirror is to be mounted, but the other structural features of the device of this invention would remain substantially the same.

While preferred specific embodiments of the invention are hereinbefore set forth, it is to be clearly understood that the invention is not to be limited to the exact constructions, mechanisms and devices illustrated and described, because various modifications of these details may be provided in putting the invention into practice within the purview of the appended claims.

What is claimed is:

1. In a rear vision attachment for motor vehicles, the structure comprising a plate member, a pair of spaced ears extending from said plate member, a tubular section having an end thereof adjacent said plate member flattened and pivotally supported between said ears for movement in a given plane, a tubular arm adapted to support a mirror on one end thereof and having the other end telescoped with the free end of said tubular section, an arcuate guide support extending from said plate member in said given plane beyond said ears and passing through oppositely disposed aligned apertures in said tubular section and arm, and screw means, passing through other threaded aligned apertures of said tubular arm and tubular section positioned in quadrature with respect to said first apertures, adjustably securing the said arm and guide together.

2. A device for adjustably supporting a mirror on motor vehicles comprising a plate, a mirror-carrying tubular arm extending toward said plate and having a free end thereof adjacent said plate, a tubular section having one end thereof telescoped over the free end of said arm and the other end thereof flattened, a pair of spaced ears extending from said plate and receiving said flattened end therebetween, a pivot pin passing transversely through said ears and flattened end for rotational movement of said tubular arm and tubular section thereon in a given plane, an arcuate guide support extending from said plate in said given plane and passing through aligned apertures in said telescoped tubular arm and tubular section, and screw means passing through other apertures in said telescoped tubular arm and tubular section perpendicularly to said guide support adjustably securing said guide, arm and section together.

3. A device for adjustably supporting a mirror on motor vehicles comprising a plate, a mirror-carrying tubular arm extending toward said plate and having a free end thereof adjacent said plate, a tubular section having one end thereof telescoped over the free end of said tubular arm and the other end thereof flattened, said flattened end having serrations on opposing surfaces thereof, a pair of spaced ears extending from said plate and each serrated internally and longitudinally thereof for the mating of said serrations of said ears and flattened end received between said ears, a bolt member passing transversely through said ears and flattened end for rotational movement of said tubular arm and tubular section thereon in a given plane, a nut threaded on one end of the bolt member and a head on the opposing end of said bolt member for rigidly securing said ears and flattened end together, an arcuate guide extending from said plate in said given plane and passing through aligned apertures in said telescoped tubular arm and tubular section, and screw means passing through other apertures in said telescoped tubular arm and tubular section perpendicularly to said guide support adjustably securing said guide, arm and section together.

THEODORE L. BEACH, Jr.

References Cited in the file of this patent

UNITED STATES PATENTS

| Number | Name | Date |
|---|---|---|
| 147,362 | Boudren | Feb. 10, 1874 |
| 436,717 | Moore | Sept. 16, 1890 |
| 663,121 | Frost | Dec. 4, 1900 |
| 1,339,833 | Saltmarsh et al. | May 11, 1920 |
| 1,362,856 | Drake et al. | Dec. 21, 1920 |
| 1,445,918 | Sterling | Feb. 20, 1923 |

FOREIGN PATENTS

| Number | Country | Date |
|---|---|---|
| 19,972 | Great Britain | of 1905 |